(12) United States Patent
Schlögl

(10) Patent No.: US 12,123,197 B2
(45) Date of Patent: Oct. 22, 2024

(54) GLASS CONSTRUCTION FOR BALUSTRADE GLAZING AND/OR RAILING GLAZING OR GLASS SUPPORTS

(71) Applicant: Sedak GmbH & Co. KG, Gersthofen (DE)

(72) Inventor: Fritz Schlögl, Stadtbergen (DE)

(73) Assignee: Sedak GmbH & Co. KG, Gersthofen (DE)

( * ) Notice: Subject to any disclaimer, the term of this patent is extended or adjusted under 35 U.S.C. 154(b) by 834 days.

(21) Appl. No.: 17/282,830

(22) PCT Filed: Sep. 26, 2019

(86) PCT No.: PCT/EP2019/076101
§ 371 (c)(1),
(2) Date: Apr. 5, 2021

(87) PCT Pub. No.: WO2020/069983
PCT Pub. Date: Apr. 9, 2020

(65) Prior Publication Data
US 2021/0348393 A1    Nov. 11, 2021

(30) Foreign Application Priority Data

Oct. 5, 2018 (DE) .......................... 102018124601.3
Oct. 5, 2018 (DE) .......................... 202018105700.6

(51) Int. Cl.
*E04F 11/18* (2006.01)
*B32B 17/10* (2006.01)

(52) U.S. Cl.
CPC .... *E04F 11/1853* (2013.01); *B32B 17/10045* (2013.01); *B32B 17/10302* (2013.01); *B32B 2419/00* (2013.01)

(58) Field of Classification Search
CPC ........ B32B 17/10005; B32B 17/10009; B32B 17/10036; B32B 17/10293; B32B 17/10302
See application file for complete search history.

(56) References Cited

U.S. PATENT DOCUMENTS 5,637,363 A * 6/1997 Leray ................ B32B 17/10036
156/107
5,733,382 A * 3/1998 Hanoka ................... H02S 30/10
156/286

(Continued)

FOREIGN PATENT DOCUMENTS

DE   4415432 A1 * 11/1995 ............. A47B 13/08
DE  19923152 A1 * 11/2000 ....... B32B 17/10036

(Continued)

OTHER PUBLICATIONS

International Search Report and Written Opinion of the International Searching Authority for PCT/EP2019/076101 dated Nov. 21, 2019, 61 pages.

(Continued)

*Primary Examiner* — Jonathan P Masinick
(74) *Attorney, Agent, or Firm* — Boardman & Clark LLP

(57) ABSTRACT

Disclosed is an invention that relates to a glass construction for balustrade glazing and/or railing glazing or glass supports, comprising a composite element, which is designed as a glass laminate and consists of at least two glass panes, which are connected by an adhesive intermediate layer made of plastic. According to the invention, in particular at least one edge of the composite element has an edge protector, which is connected at least in parts to the respective end faces of the at least two glass panes of the glass laminate in such a way that the intermediate layer is protected from the effects of moisture.

21 Claims, 3 Drawing Sheets

(56) References Cited

U.S. PATENT DOCUMENTS

Figure 1:
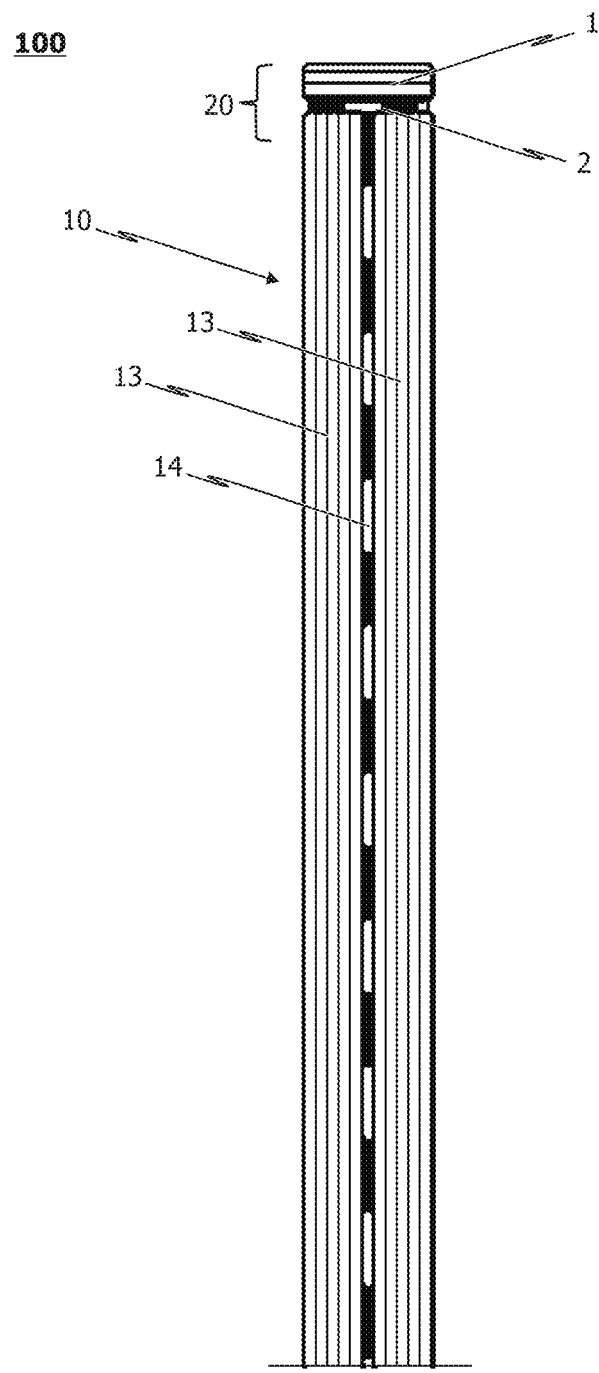

| | | | | |
|---|---|---|---|---|
| 7,165,362 | B2* | 1/2007 | Jobs | B32B 17/10743 52/179 |
| 8,240,111 | B2* | 8/2012 | Feigl | E04F 11/1851 52/832 |
| 8,846,174 | B2* | 9/2014 | Leighton | C04B 35/63456 428/68 |
| 10,532,636 | B2* | 1/2020 | Miyasaka | B32B 27/302 |
| 2011/0219722 | A1* | 9/2011 | Feigl | E04F 11/1812 52/698 |
| 2011/0303287 | A1* | 12/2011 | Lee | B32B 17/10788 136/259 |
| 2013/0248792 | A1* | 9/2013 | Bangratz | E04F 11/1851 256/24 |
| 2017/0122027 | A1* | 5/2017 | Bumann | B32B 17/10155 |
| 2017/0341347 | A1* | 11/2017 | Nakamura | B32B 17/1066 |

FOREIGN PATENT DOCUMENTS

| | | | | | |
|---|---|---|---|---|---|
| DE | 102006028766 | A1 | * | 12/2007 | .......... E04F 11/1851 |
| DE | 102007022073 | A1 | * | 12/2008 | ....... B32B 17/10036 |
| DE | 102009058136 | A1 | * | 6/2011 | ....... B32B 17/10036 |
| DE | 202012101023 | U1 | * | 7/2013 | ....... B32B 17/10036 |
| DE | 202012104033 | U1 | | 1/2014 | |
| DE | 102018008210 | A1 | * | 4/2020 | |
| JP | 2002187746 | A | * | 7/2002 | ....... B32B 17/10018 |
| JP | 2002201049 | A | * | 7/2002 | |
| WO | 2014098160 | A1 | | 6/2014 | |

OTHER PUBLICATIONS

International Preliminary Report on Patentability for PCT/EP2019/076101, dated Oct. 15, 2020, 25 pages.

* cited by examiner

GLASS CONSTRUCTION FOR BALUSTRADE GLAZING AND/OR RAILING GLAZING OR GLASS SUPPORTS

CROSS-REFERENCE TO RELATED APPLICATIONS

This application is a national phase filing of International Patent Application No. PCT/EP2019/076101, entitled "Glass Construction for Balustrade Glazing and/or Railing Glazing or Glass Supports", which has an international filing date of Sep. 26, 2019, which claims priority to German Patent Application No. 202018105700.6 filed Oct. 5, 2018, and which also claims priority to German Patent Application No. 102018124601.3 filed Oct. 5, 2018, the entire contents of each of which is hereby incorporated herein by reference for all purposes.

The present invention relates to a glass construction particularly for balustrade glazing and/or railing glazing or glass supports.

Glazings are known in which the edges of the glass panes are framed in by frame profiles. These frame profiles fix the glass panes and thus the glazing to the respectively given spatially fixed structural components. Such glazings are then accordingly supported at least at their upper and lower edge regions and the frame profiles protect them from atmospheric influences, in particular moisture, as well as from impacts.

A glass-paneled railing is known from WO 2009/003431 A1 in which the glass panes are fixed in place in a dimensionally stable U-profile by their base region. A plurality of such glass panes fixed in place in a U-profile are joined together at their upper open edge by a continuous handrail. The handrail thereby protects the upper open edge of the glass panes fixed in place in the U-profile.

According to DE 20 2009 013 904 U1, a comparable glass pane railing can be used as floor-to-ceiling glazing. To that end, the lower end region of the glass pane can be fixed in place in a dimensionally stable U-profile while the upper end region of the glass pane can be fixed between two upper structural components. The two upper structural components are plate-shaped and can be fixed to one another in high-tensile and pressure-resistant manner by means of at least two screws.

Glass has become a virtually indispensable building material in contemporary architecture. Ongoing advancements in manufacturing and processing technology and the continuous improvement of ready-to-use products play a decisive role in meeting increased functional requirements as well as the quest for new aesthetic forms of expression.

When large-scale glass constructions in particular are used for balustrade and/or railing glazing, however, individual units of glass can pose a challenge in terms of resistance to mechanical and chemical stresses. Balustrade glazings and/or railing glazings usually have at least one surface element designed as a glass laminate which consists of at least two glass panes joined together by a plastic adhesive interlayer. When such surface elements are used as balustrade and/or railing glazing, for example, particularly outdoors, they are in particular exposed to static and dynamic loads which, under some circumstances, adversely affect weathering due to exposure to ultraviolet radiation, high temperature and high atmospheric humidity. In particular, a significant decrease in flexural rigidity was found in the case of glass laminates exposed to high atmospheric humidity. This showed that the moisture content of the glass laminate's plastic interlayer had a major influence on material behavior relative to "adhesive and tensile properties." This can then particularly be problematic when the glass construction serves as a load-bearing glass support.

Therefore, in order to be able to permanently use a surface or composite element designed as a glass laminate as a balustrade glazing and/or railing glazing or as a load-bearing glass support, particularly outdoors, it is necessary to accordingly design the adhesive plastic interlayer(s) which hold(s) the at least two glass panes of the glass laminate together so as to be temperature and weather resistant so as to achieve the necessary edge stability of the glass laminate.

Particularly unrealizable in the glass laminates known from the prior art is long-term edge stability with respect to atmospheric influences and the effects of delamination. When the edges of market-available glass laminates are exposed to weathering, delamination and humidification of the plastic interlayer serving as a composite material can in particular always be observed after some time such that it is inevitable that pane edge clouding will occur after a certain period of time. Depending on the climatic conditions, these effects will occur sooner the longer the edges of the glass laminate are exposed to high temperatures and high atmospheric humidity.

When the ambient humidity is high, the plastic adhesive interlayer thereby absorbs more water which becomes deposited in the plastic structure. Given an affinity between the polar groups of the polymer molecules and the dipole of the water molecule, water is partly stored in the free volume and partly between the weakly bound molecule chains, which in the latter case leads to the plastic swelling. This process is normally reversible because when the plastic interlayer dries, the water is excreted again as the plastic contracts. Internal stresses, however, do arise during swelling or contraction which can lead to microcracks.

The plastic interlayer of the surface element designed as a glass laminate is thus subject to irreversible aging. This time-related impact on the material of the plastic interlayer affects the edge region of the glass laminate in particular.

To protect against aging, particularly due to thermal or solar oxidation, it is conceivable to add small amounts of stabilizers to the plastic material of the interlayer. The two most important groups of such additives are antioxidants for binding and deactivating the radicals developing during oxidation as well as UV stabilizers for absorbing radiation, binding radicals and deactivating energetically excited molecular groups.

However, the impact of moisture cannot be reduced or minimized by adding appropriate stabilizers.

In particular, due to the microscopic properties of the films currently used in the construction trade for interlayers, moisture can also have a decisive influence on the load-bearing behavior of the glass laminate. Moisture can work its way into the film interstice through the open edge of a glass laminate, for example due to the edge being exposed to the weather or due to the wrong environmental conditions. If the moisture content deviates from the film's optimal moisture content, this can cause a strong negative change in the material behavior and the load capacity of the film. To be noted is that although moisture can only diffuse a few centimeters into the edge region of a glass laminate, this generally already has negative effects, at least on the appearance. Damage caused by moisture is often characterized by blistering, changes in color (clouding) and large-scale delamination (debonding).

Therefore, the construction trade, and property construction in particular, commonly refrains from using balustrade glazing and/or railing glazing which has an edge exposable to the weather. This was seen as the "natural" limitation in property construction as regards the use of glass material. Instead, glass railings have to date been constructed so that the upper "open" edge, or the upper "open" edge of the glass laminate respectively, is fixed in place by a metal or plastic profile, whereby this metal or plastic profile can also be designed as a handrail. However, such a metal or plastic profile on the upper "open" edge of the glass laminate has a negative effect on the overall appearance of the railing glazing.

On the basis of this situation, the invention is based on the task of specifying a glass construction for balustrade glazing and/or railing glazing or for load-bearing glass supports which is able to overcome the existing preconception held within professional circles.

In particular to be specified is a glass construction having a surface element or composite element designed as a glass laminate which consists of at least two glass panes joined by an adhesive interlayer of plastic, wherein the glass laminate of this glass construction does not exhibit any moisture-caused damage even after sustained exposure to weathering over a long period of time.

According to the invention, this task is solved by the subject matter of independent claim 1, whereby advantageous further developments of the glass construction are specified in the dependent claims.

Accordingly, the invention relates in particular to a glass construction for balustrade glazing and/or railing glazing or for glass supports having a surface element or composite element designed as a glass laminate. The surface element or composite element designed as a glass laminate consists of at least two panes of glass joined by an adhesive interlayer made of plastic. According to the invention, it is particularly provided for at least one edge of the surface or composite element, and in particular the upper edge of the surface or composite element which is exposed to weathering, to exhibit an edge protector which is at least in areas joined to the respective end faces of the at least two glass panes such that the plastic interlayer is effectively protected from the effects of moisture.

In this context, preferential implementations of the inventive glass construction particularly provide for the edge protector to be formed from a crystal-clear material, in particular glass, and the at least one edge of the surface or composite element to be laminated particularly with a crystal-clear sealant such that the respective end faces of the at least two glass panes and the end face of the interlayer and are wetted and in particular enclosed by the crystal-clear sealant.

This type of laminating of the edge protector onto the glass edge to be protected has the advantage, on the one hand, of the adhesive plastic interlayer between the at least two glass panes of the glass laminate being permanently protected against the effects of moisture and, on the other hand, of the edge of the surface element or composite element being effectively protected against mechanical loads, in particular impacts, etc., and mechanical delamination thus prevented. In other words, in this embodiment, the edge protector serves as "sacrificial material" should, for example, an object strike the edge.

Moreover, an edge protector made of a crystal-clear material which is laminated onto the edge to be protected by way of a crystal-clear sealant provides the advantage of the plastic adhesive layer between the glass panes of the glass laminate no longer being visible even when the edge is viewed from directly above. Hence, the glass construction is particularly suitable as an architectural highlight, for example for balustrade or railing glazing.

A particularly easily realized yet nevertheless effective embodiment of the inventive glass construction provides for the preferably crystal-clear sealant to be at least in part or in areas formed by a region of the adhesive interlayer which protrudes over the at least one edge of the surface or composite element. Under certain circumstances, this embodiment enables dispensing with additional sealants. The region of the adhesive interlayer protruding over the at least one edge of the surface or composite element is thereby appropriately folded so that the interlayer region at least partially encloses the respective end faces of the at least two glass panes of the glass laminate.

It is particularly preferential in this context for the interlayer, or the interlayers of the surface/composite element respectively, to be at least in part or in areas formed from an ionoplast polymer or a material having similar material properties such as, for example, high-strength polyvinyl butyral (PVB). Compared to conventional PVB interlayers, an interlayer made of high-strength polyvinyl butyral or an ionoplast interlayer is considerably tougher and stiffer, so that the surface/composite element will not become unstable even upon introduction of a greater load, in particular weight, but instead remains statically self-supporting and stable as a whole.

Alternatively thereto, however, it is also conceivable for the interlayer to comprise polyvinyl butyral (PVB), ethylene vinyl acetate (EVA), polyacrylate (PA), polymethyl methacrylate (PMMA) and/or polyurethane (PUR). Such materials can particularly be selected for the interlayer when the glass construction only needs to absorb small loads.

If a further sealant is to be used additionally or alternatively to the interlayer, using acrylic, butyl, silicone and/or polyurethane is advisable. As with the material of the interlayer, the material of the additional sealant—should same be used—is in particular of crystal-clear rendering.

It is in principle conceivable for the glass strip used as an edge protector to have a width which at least substantially corresponds to the thickness of the surface or composite element. This thereby achieves a virtually invisible continuous closure of the surface or composite element.

Alternatively thereto, however, it is also conceivable to select a glass strip width which is wider and in particular significantly wider than the thickness of the surface or composite element. In this case, the glass strip would have additional function such as, for example, the function of a handrail.

In contrast, another implementation of the inventive glass construction provides for the surface or composite element to comprise an internal glass laminate of at least two glass panes joined together by an interlayer, wherein the internal glass laminate is preferably joined on both sides to at least one exterior glass pane or one exterior glass laminate by a respective interlayer. In this embodiment, it is advisable for the glass strip to be laminated onto the at least one edge of the surface or composite element such that preferably only the end face of the internal glass laminate is at least partially covered by the glass strip.

This embodiment further lends itself to not using all the interlayers of the glass laminate in the laminating of the glass strip but rather for example only one single interlayer which protrudes over the at least one edge of the surface or composite element in some areas, wherein the protruding region of the adhesive interlayer is accordingly folded so that the interlayer region at least partially encloses the respective end faces of the individual glass panes of the glass laminate.

The inventive glass construction is particularly suitable as a glass construction for a railing or as a glass support for indoor and outdoor building elements such as, for example, balconies, galleries, stairs, landings, terraces and the like.

The present invention insofar further relates to a corresponding railing, or a corresponding glass support respectively, having a glass construction of the aforementioned type.

The following will reference the accompanying drawings in describing exemplary embodiments of the glass construction according to the invention in greater detail.

Figure 2:
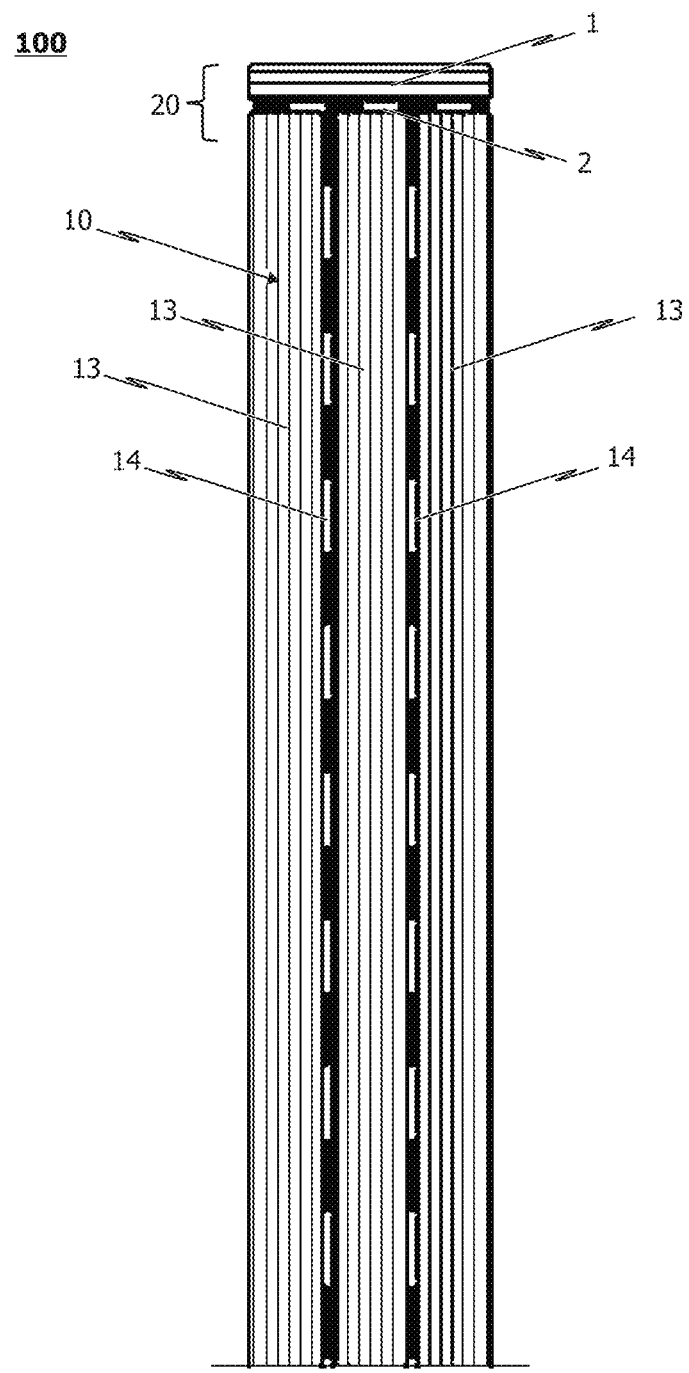
Figure 3:
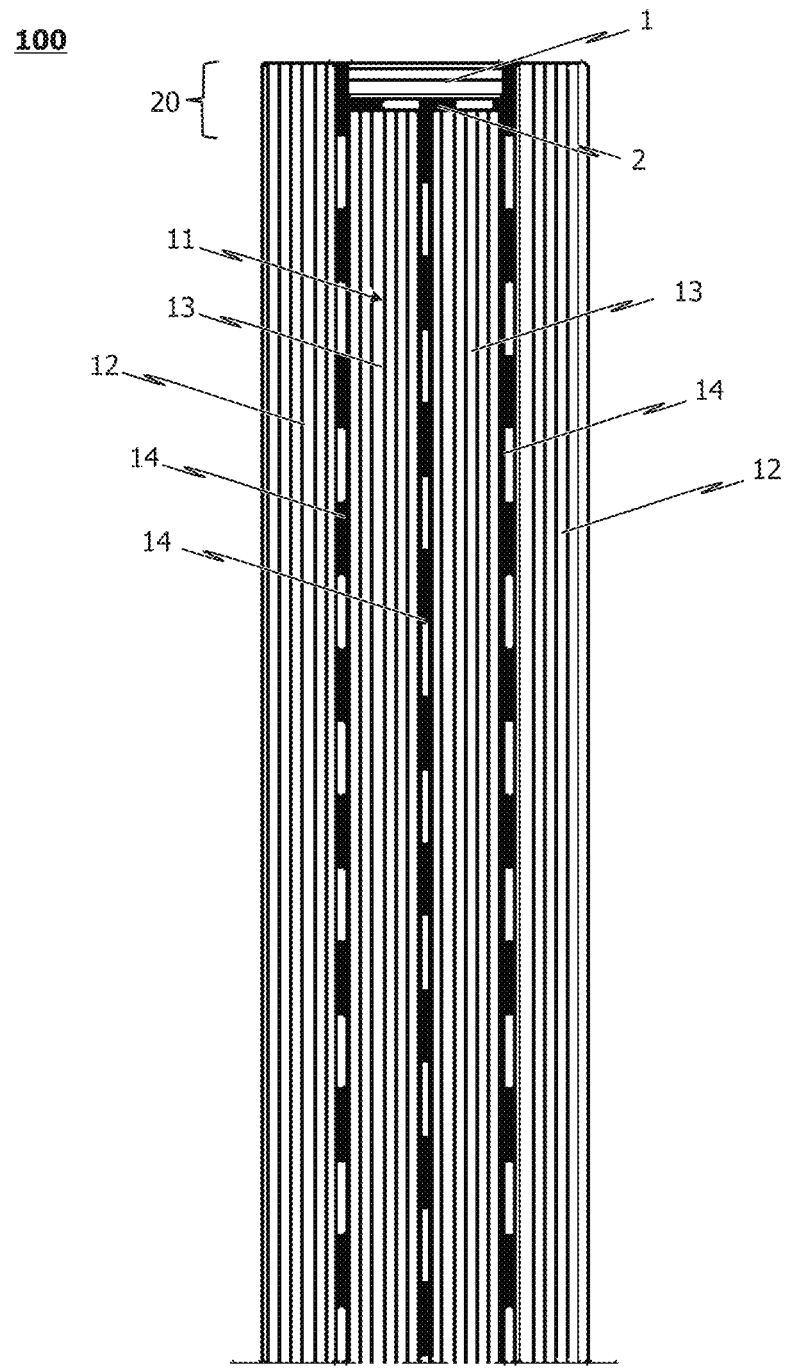

Shown are:

FIG. 1 a first exemplary embodiment of the inventive glass construction in schematic cross-sectional view;

FIG. 2 a second exemplary embodiment of the inventive glass construction in schematic and cross-sectional view; and FIG. 3 a third exemplary embodiment of the inventive glass construction in schematic and cross-sectional view.

Despite the risks known in professional circles, balustrade and railing glazings and load-bearing glass supports continue to be built from laminated safety glass with the upward-facing open lamination edge exposed to the weather. The durability of this openly exposed edge continues to be the subject of extensive debate among technical consultants. When standing liquid/moisture remains on the edge for too long, the composite film (=plastic interlayer) can thereby become unsightly or be damaged and delaminated.

These current disadvantages are to be remedied by placing a glass strip on the open edge exposed to the weather. Permanently covering the open composite edge is in particular effected by placing a polished glass strip thereupon. Of course the placing of metal strips such as those made for example of titanium or stainless steel would also be a conceivable technical variant.

Using glass or titanium as an edge protector has the additional advantage of there being no temperature change-induced differences in length such as occur when for example stainless steel strips are used.

The glass construction 100 according to the invention is preferably suitable as a railing for indoor and outdoor building elements such as balconies, galleries, stairs, landings, terraces and the like. The glass construction 100 comprises a surface or composite element 10 designed as a glass laminate. The surface or composite element 10 consists of at least two glass panes 13 which are joined together by an adhesive interlayer 14 made of plastic.

In the embodiment depicted schematically in FIG. 1, the surface/composite element 10 designed as a glass laminate has exactly two glass panes 13, whereas in the embodiment shown in FIG. 2, the glass laminate is formed from a total of three glass panes 13 with corresponding plastic interlayers 14.

In contrast, FIG. 3 shows an embodiment of the inventive glass construction 100 in which the surface or composite element 10 has an internal glass laminate 11 of two glass panes 13 joined together by an interlayer 14, whereby a respective interlayer 14 bonds the internal glass laminate 11 on both sides to an exterior glass pane 12.

Common among the embodiments of the inventive glass construction 100 shown in the drawings is that at least the upper edge 20 of the surface or composite element 10 has a laminated edge protector 1 thereupon in order to protect said edge 20 of the surface or composite element 10 from mechanical influences and—particularly when exposed to weathering—from moisture. In particular, the edge protector 1 is laminated onto the edge 20 of the surface or composite element 10 such that the interlayer/interlayers 14 between the glass panes 13 of the glass laminate is/are protected from the effects of moisture.

In the embodiment shown in FIG. 3, the edge protector 1 is thereby laminated onto the edge 20 of the surface or composite element 10 such that preferably only the end face of the internal glass laminate 11 is at least partially covered by the edge protector 1.

In the embodiments shown in the drawings, the edge protector 1 is designed in particular as a polished glass strip made from a crystal-clear material, whereby this glass strip is preferably laminated onto the edge 20 of the glass laminate to be protected using a crystal-clear sealant 2. The sealant 2 can comprise acrylic, butyl, silicone and/or polyurethane, for example, and be particularly of crystal-clear rendering.

Different materials are used as the interlayer 14. Particularly good results can be achieved when the interlayer 14 comprises polyvinyl butyral (PVB), ethylene vinyl acetate (EVA), polyacrylate (PA), polymethyl methacrylate (PMMA) and/or polyurethane (PUR). The interlayer 14 is preferably transparent and crystal clear. Pursuant to embodiments, however, the interlayer 14 can also be colored or printed with motifs.

According to embodiments, it is in particular provided for at least one stabilizer, particularly an antioxidant and/or a UV stabilizer, to be added to the material of the plastic interlayer 14 in order to also protect the plastic interlayer 14 from UV radiation or from aging due to UV radiation respectively.

The solution according to the invention provides much greater reliability in ensuring the durability of the railing. The high aesthetic demands on the upper visible edge, which thereby has no individual glass offsets or composite film interruptions, is a further advantage.

In particular, the inventive solution is also suitable for glass supports in which at least one end face is situated outdoors. An edge protector of the inventive type covering the end face creates an optimal surface in terms of bonding, in particular adhesion, to other components. By the glass strip being laminated onto the end edges of the individual glass panes of the glass laminate, an optimum transfer of force is achieved from the other component to the glass support, or the glass panes of the glass support respectively, as the laminated glass strip redirects or respectively targets the introduction of the force introduced into the glass strip into the glass panes of the glass support.

LIST OF REFERENCE NUMERALS 1 edge protector/glass strip
2 sealant
10 surface or composite element/glass laminate
11 internal surface or composite element/glass laminate
12 exterior surface or composite element/glass laminate
13 glass pane of glass laminate
14 interlayer/composite film
100 glass construction

The invention claimed is:

1. A glass construction for balustrade glazing and/or railing glazing or glass supports comprising a composite element designed as a glass laminate which consists of at least two glass panes joined by an adhesive interlayer of plastic, wherein at least one edge of the composite element exhibits an edge protector which is at least in areas joined to respective end faces of the at least two glass panes of the glass laminate such that the interlayer is protected from the effects of moisture,
- wherein the edge protector comprises a glass strip which is at least in areas joined to the at least one edge of the composite element by means of a sealant.

2. The glass construction according to claim 1,
- wherein the edge protector is formed from a crystal-clear material and at least in areas joined to the at least one edge of the composite element by a crystal-clear sealant such that the respective end faces of the at least two glass panes of the glass laminate and/or the end face of the interlayer is wetted and/or enclosed by the crystal-clear sealant.

3. The glass construction according to claim 2,
- wherein the crystal-clear sealant is at least in part or in areas formed by a region of the adhesive interlayer which protrudes over the at least one edge of the composite element.

4. The glass construction according to claim 1,
- wherein the glass strip has a width which at least substantially corresponds to the thickness of the composite element.

5. The glass construction according to claim 1,
- wherein the glass strip has a width which is wider than the thickness of the composite element.

6. The glass construction according to claim 1,
- wherein the glass strip has a width which is narrower than the thickness of the composite element, wherein the glass strip is joined to the at least one edge of the composite element such that the glass strip covers an end face of at least one interlayer between two glass panes.

7. The glass construction according to claim 6,
- wherein the composite element comprises an internal glass laminate of at least two glass panes joined together by an interlayer.

8. The glass construction according to claim 7,
- wherein the glass strip is laminated onto the at least one edge of the composite element such that only the end face of the internal glass laminate is at least partially covered by the glass strip.

9. The glass construction according to claim 7,
- wherein the internal glass laminate is joined on both sides to at least one exterior glass pane or one exterior glass laminate by means of a respective interlayer.

10. The glass construction according to claim 1,
- wherein the sealant comprises acrylic, butyl, silicone and/or polyurethane.

11. The glass construction according to claim 1,
- wherein the interlayer comprises polyvinyl butyral (PVB), ethylene vinyl acetate (EVA), polyacrylate (PA), polymethyl methacrylate (PMMA) and/or polyurethane (PUR).

12. The glass construction according to claim 1,
- wherein the interlayer comprises an ionoplast polymer.

13. The glass construction according to claim 12,
- wherein the interlayer is designed as an ionoplast film and is transparent, colored or printed with motifs.

14. The glass construction according to claim 1,
- wherein the interlayer is formed from a casting resin.

15. The glass construction according to claim 1,
- wherein at least one stabilizer is added to the material of the interlayer.

16. The glass construction according to claim 15,
- wherein the at least one stabilizer is an antioxidant and/or a UV stabilizer.

17. A use of a glass construction according to claim 1 as a glass support and/or railing for indoor and/or outdoor building elements.

18. The use of a glass construction according to claim 17,
- wherein the glass support and/or railing is a balcony, gallery, stairs, landing, or terrace.

19. A railing or glass support for indoor and/or outdoor building elements having a glass construction according to claim 1.

20. The railing or glass support according to claim 19,
- wherein a lower edge 20 of the glass construction is or can be joined to a support profile, and wherein at the least an opposite upper edge of the glass construction exhibits the edge protector.

21. The railing or glass support according to claim 19,
- wherein the railing or glass support is a balcony, gallery, stairs, landing, or terrace.

* * * * *